US011630658B2

(12) United States Patent
Solomon et al.

(10) Patent No.: US 11,630,658 B2
(45) Date of Patent: *Apr. 18, 2023

(54) BLOCKCHAIN BASED SECURE SOFTWARE UPDATES FOR IOT DEVICES

(71) Applicant: Santa Clara University, Santa Clara, CA (US)

(72) Inventors: Gabriel Jerome Solomon, Campbell, CA (US); Peng Zhang, Shenzhen (CN); Yuhong Liu, San Jose, CA (US); Rachael Brooks, San Diego, CA (US)

(73) Assignee: Santa Clara University, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,481

(22) Filed: Sep. 20, 2022

(65) Prior Publication Data

US 2023/0015925 A1 Jan. 19, 2023

Related U.S. Application Data

(63) Continuation of application No. 17/328,126, filed on May 24, 2021, now Pat. No. 11,481,207.

(60) Provisional application No. 63/031,887, filed on May 29, 2020.

(51) Int. Cl.
*G06F 8/65* (2018.01)
*H04L 9/06* (2006.01)
*G16Y 30/10* (2020.01)
*H04L 9/00* (2022.01)

(52) U.S. Cl.
CPC ............... *G06F 8/65* (2013.01); *G16Y 30/10* (2020.01); *H04L 9/0618* (2013.01); *H04L 9/50* (2022.05)

(58) Field of Classification Search
USPC ........................................................ 717/168
See application file for complete search history.

(56) References Cited

U.S. PATENT DOCUMENTS

| | | | | |
|---|---|---|---|---|
| 5,892,900 | A * | 4/1999 | Ginter | G06F 21/78 |
| | | | | 726/26 |
| 10,936,294 | B2 * | 3/2021 | Marks | G06F 11/302 |
| 11,063,760 | B2 * | 7/2021 | Subba | H04L 9/085 |
| 2017/0352027 | A1 * | 12/2017 | Zhang | G06Q 20/065 |
| 2018/0117447 | A1 * | 5/2018 | Tran | G06Q 20/382 |
| 2018/0167198 | A1 * | 6/2018 | Muller | H04L 9/0825 |
| 2018/0176229 | A1 * | 6/2018 | Bathen | H04L 9/3247 |
| 2019/0042228 | A1 * | 2/2019 | Nolan | G06F 8/64 |

(Continued)

FOREIGN PATENT DOCUMENTS

WO WO-2019185709 A1 * 10/2019 ......... G06F 16/2379

OTHER PUBLICATIONS

Zorzo et al.; "Dependable IoT Using Blockchain-Based Technology"; 2018 Eighth Latin-American Symposium on Dependable Computing (LADC), pp. 1-9; 2018 (Year: 2018).*

(Continued)

*Primary Examiner* — Qing Chen
*Assistant Examiner* — Clint Thatcher
(74) *Attorney, Agent, or Firm* — Lumen Patent Firm

(57) ABSTRACT

Methods and systems for provable, auditable and secure software updates for resource-constrained IoT devices are provided via a security framework and a protocol for owner-controlled software updates for IoT devices through blockchain.

6 Claims, 2 Drawing Sheets

(56) References Cited

U.S. PATENT DOCUMENTS

| | | | | |
|---|---|---|---|---|
| 2019/0057382 A1* | 2/2019 | Wright | .................. | H04L 9/0891 |
| 2019/0349426 A1* | 11/2019 | Smith | ..................... | H04W 4/08 |
| 2019/0373472 A1* | 12/2019 | Smith | .................. | H04L 9/3239 |
| 2020/0394654 A1* | 12/2020 | Concannon | .......... | G06Q 20/405 |
| 2021/0067536 A1* | 3/2021 | Mylrea | ................. | H04L 63/126 |
| 2021/0373875 A1* | 12/2021 | Solomon | ................ | G16Y 30/10 |

OTHER PUBLICATIONS

"How Blockchain and Smart Contracts Can Impact IoT"; Medium.com website [full URL in ref.]; 2018 (Year: 2018).*

* cited by examiner

BLOCKCHAIN BASED SECURE SOFTWARE UPDATES FOR IOT DEVICES

CROSS-REFERENCE TO RELATED APPLICATIONS

This application is a continuation of U.S. patent application Ser. No. 17/328,126 filed May 24, 2021, which is incorporated herein by reference. U.S. patent application Ser. No. 17/328,126 claims priority from U.S. Provisional Patent Application 63/031,887 filed May 29, 2020, which is incorporated herein by reference.

FIELD OF THE INVENTION

This invention relates to methods and systems for provable and secure software updates for resource-constrained IoT devices.

BACKGROUND OF THE INVENTION

With a large number of connected Internet of Things (IoT) devices deployed across the world, they have become popular targets of malicious attacks, raising great security challenges. Manufacturers are making great efforts to keep the software on these devices up-to-date to protect the security of these IoT devices.

However, the software update process itself may also be manipulated by attackers, such as a roll-back attack and replay message attack. Cryptography-based solutions may effectively defend against such attacks. However, as many IoT devices are resource-constrained devices, they cannot afford the high resource requirements and heavy computation overhead caused by Cryptography based security solutions. Thus, the problem of securing resource-constrained IoT devices has yet to be solved.

In addition, in regulated environments (like healthcare, automotive industry, etc.) the ability to audit software updates and prove a device is updated is critical. For example, automotive companies must prove that they serviced recalled vehicles. "Servicing" a vehicle in many cases is performed through a software update. Record and proof of the update must be kept by the manufacturer.

The present invention addresses these problems and needs in the art.

SUMMARY OF THE INVENTION

Terminology & Definitions

Blockchain is a graph of nodes that are connected to each other. The nodes hold records of data that are public or private. The blockchain can execute computer instructions upon the data and transactions within the network. The nodes are linked together by using cryptographic hashes. The blockchain is distributed across multiple computers and remained in synchronization with others through a consensus algorithm.

Smart Contract is a software algorithm implemented an algorithm that is executed as an indivisible atomic transaction on the blockchain.

SHA3 is a type of cryptographic hash. A cryptographic hash is an algorithm that takes input data arbitrarily large in size and outputs a fixed size (often much smaller) specific string of text. If the data is altered in any way, the string of text (the hash) is also changed in a way that is both one-way and collision-free. In other words, that hash mathematically uniquely identifies that data.

ECDSA is an elliptic curve digital signature algorithm, which is a cryptographic algorithm that produces a digital signature based on a piece of data. The digital signature of the data is used by the receiver of the data to mathematically prove that the sender is the specific sender that signed the data. The key advantage of ECDSA is that the size of the signature is smaller than many other signature algorithms while maintaining an equivalent or better level of security.

Asymmetric Cryptography is a cryptographic technique to exchange a message on a public communication mechanism (like the Internet) using a public-key such that only the intended receiver who has their own personal private-key can decrypt the message.

Symmetric Cryptography is a cryptographic technique to encrypt a message using a key shared between two parties. The encrypted message can only be decrypted using the shared key.

Manufacturer (M) is the company, vendor, or business that manufactures and produces the IoT device. The manufacturers range in size from large to small and may or may not be independent of each other. The following notation is used: $M=\{m1, m2, \ldots, mn\}$ where $mi \in M$, $i \in Z+$, $n \geq 1$.

Software Update (B) is the software update payload (often a binary file) that is transferred to the device. The software update can either be an initial installation of a piece of software or a revision to existing software on the IoT device. The following notation is used: $B=\{b_1, b_2, \ldots, b_n\}$ where $b_j \in B$, $j \in Z+$, $n \geq 1$.

Header ($h_j$) is the first n-bytes of the software update ($b_j$) that contains information on the manufacturer, version, and other meta-data related to the software release. $h_j$ is part of $b_j$.

Blockchain payload nodes (P) are the nodes in the blockchain service update requests process that are paid a fee for hosting and serving the payload (B). These nodes detect and verify the software update version. They maintain the blockchain public ledger. They are paid a fee for their services. The following notation is used: $P=\{p_1, p_2, \ldots, p_n\}$ where $p_k \in P$, $k \in Z+$, $n \geq 1$.

Transaction (Tx) represents the transaction record (number j) in the public ledger of the blockchain specifying a specific software update transaction. $Tx_j$ where $j \in Z+$, $n \geq 1$.

Owner (O) is the consumer, individual, person, or potentially a client-company who owns and/or manages 1, 2, ..., n IoT devices. The following notation is used: $O=\{o_1, o_2, \ldots, o_n\}$ where $o_l \in O$, $l \in Z+$, $n \geq 1$.

IoT Device (D) is an IoT device. Examples of IoT devices range are sensors, a smart-light bulb, smart-TV, phone, to an IoT device in a vehicle. The set of devices are explicitly heterogeneous and resource-constrained. $D=\{d_{11}, d_{12}, \ldots, d_{n1}, d_{nm}\}$ where $d_{il} \in D$, $i \in Z+$, $l \in Z+$, $n \geq 1$, $m \geq 1$ with $i \in \{manufacturers\}$ and $l \in \{owners\}$.

The present invention provides a method for updating software between a manufacturer and Internet of Things (IoT) devices of consumers using a blockchain. A software update is encrypted and stored on a Cloud. The Cloud is defined as storage accessible over the Internet. The encrypting and storing is performed by the manufacturer. It is noted that the method applies to software updating to existing software, but also to initial or new software.

The manufacturer notifies one or more owners regarding the availability of the software update for their respective IoT devices. One or more owners submit a payment for the software update. This payment transaction is performed via a software-coded secure transaction mechanism on the blockchain. As defined herein supra, a blockchain is defined as a distributed electronic database containing transactions records accessible over an Internet, whereby the transactions records stored on the blockchain are unchangeable upon creation of the transactions records, and whereby the unchangeability upon creation is enforced through cryptography.

The encryption keys for the software update are created and then encrypted. The encrypted encryption keys are stored on the blockchain, not the software update itself. Encrypting the encryption key is important because the blockchain's ledger is public. So, if the encryption keys were not encrypted then any node in the blockchain network could decrypt and access the software update. So, the confidentiality of the encryption keys is important for software security. This technique allows the encryption keys to be part of the blockchain while remaining secure and confidential.

On the blockchain the following items are stored:
the encryption of the encryption keys,
an address of the stored and encrypted software update; and
a signature of the manufacturer;

Access information is released to the one or more owners, after successful and verified payment, regarding at least one of:
the encryption of the encryption keys,
the address of the stored and encrypted software update; and/or
the signature of the manufacturer;

With the access information and from the respective IoT device the blockchain is accessed for:
the encryption of the encryption keys,
the address of the stored and encrypted software update; and/or
the signature of the manufacturer;

The stored and encrypted software update is downloaded from the Cloud onto the respective IoT device(s). The downloaded software update is decrypted and installed on the respective IoT device(s). The step of installing the software updates the blockchain by creating an install transaction record on the blockchain. On the blockchain, a recording of the install transaction is performed and the install transaction record is encrypted making the install transaction record unchangeable.

The method could further include the step of the manufacturer auditing the software update of the IoT device by accessing the unchangeable install transaction record on the blockchain. Likewise, the method could further include the step of one or more owners auditing the software update of the IoT device by accessing the unchangeable install transaction record on the blockchain.

Advantages

Embodiments of the invention have the following advantages:
The usage of smart contracts to deliver software is a novel concept, where the most promising aspect is the potential for the contract to provide auditing capabilities for software updates. In these smart contract transactions, the owner of the device is required to approve transactions. This blockchain provides immutable proof of a software update taking place.
Higher availability than traditional client-server architectures is provided through blockchain (encryption keys) and the cloud (encrypted software update storage).
Verifiable payment for software is supported through a smart contract. Payment in exchange for software keys is an atomic and indivisible operation unlike with traditional credit cards or other financial software purchases.
ECDSA signature protects software update supply chain attacks by ensuring the software update comes from the manufacturer.
Software integrity (inability to insert malware into software) is maintained through SHA3 cryptographic hash.
Software delivery and installation can be accurately audited through the ledger of the blockchain.

BRIEF DESCRIPTION OF THE DRAWINGS

FIG. 2 of the drawings in U.S. Provisional Patent Application 63/031,887, filed May 29, 2020, to which this application claims priority, and which is incorporated herein by reference, the reader will be able to see the same process with the additions of the steps in the figures. The text of the steps is removed from FIG. 2 for clarity and compliance in this application, but each of the steps is described in the text infra.

DETAILED DESCRIPTION

The objective of the present invention is to provide methods and systems for provable and secure software updates for resource-constrained IoT devices. Accordingly, the inventors provide this via a security framework and a protocol for owner-controlled software updates for IoT devices through blockchain.

The following aspects are key objectives/aspects of the invention. Embodiments of the invention:
Categorize software updates to clearly identify the purpose of the update (security update, feature update, bug fix update, performance improvement).
Leverage blockchains to provide a secure updating process while not generating overhead for IoT devices.
Provide auditing (via blockchain) of the software updates for both the manufacturer and the owner of IoT devices.
Use smart contracts to ensure the delivery of the software and financial transaction of fees and payment.
Are suitable for securing resource-constrained (low CPU, low power, low internet connectivity) IoT devices with limited overhead.
Offload higher CPU blockchain operations to the owner's device and to the blockchain itself.

Protocol Algorithm

Figure 1:
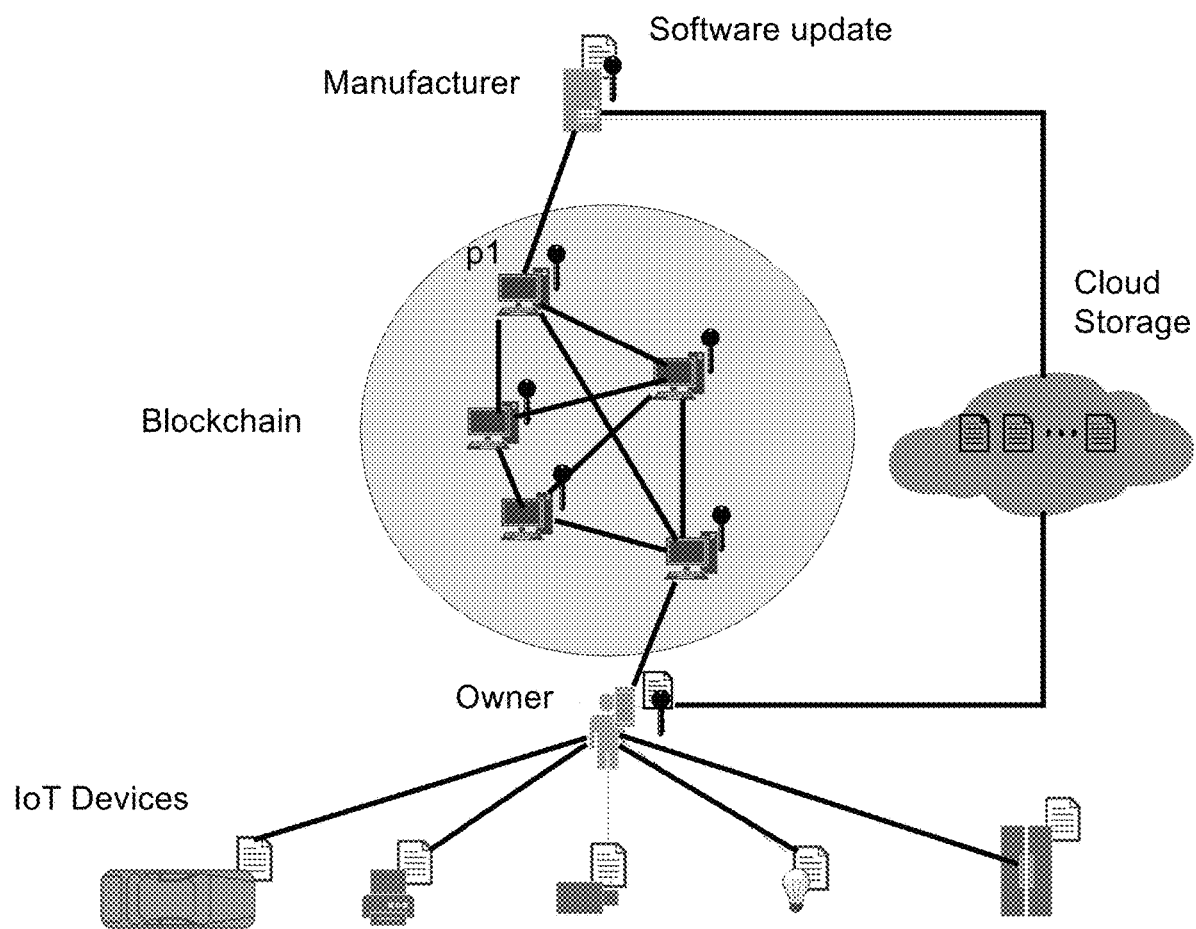
FIG. 1 shows according to an exemplary embodiment of the invention an overview of Framework Data Flow and Components.
Figure 2:
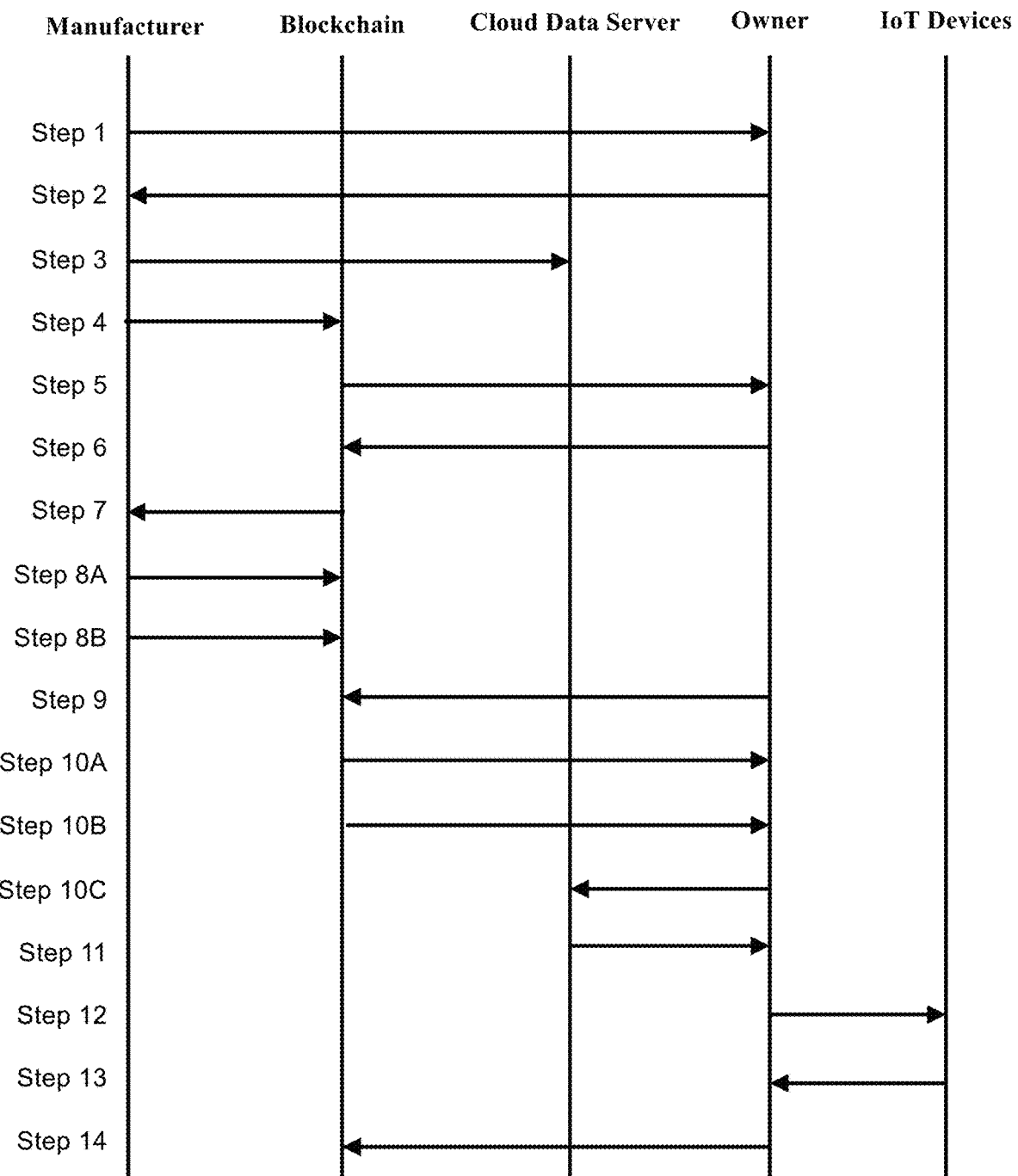
FIG. 2 shows according to an exemplary embodiment of the invention an algorithmic process for the protocol step-by-step.

FIG. 1 shows an overview of Framework Data Flow and Components. FIG. 2 shows the Algorithmic Process for the protocol step-by-step. Embodiments of the invention ensure secure software that maintains fundamental security concepts of confidentiality, integrity, availability, authenticity, and accountability. The protocol is designed to ensure several key functionalities that do not currently exist. The ordering of the steps is essential to its security.

The algorithm lends itself to parallelization. Several steps can be run at the same time without dependency on their ordering while also maintaining security. Current techniques are end-to-end sequential in nature.

The smart contract creates a secure platform to guarantee payment of software and also the delivery of the software keys. Software that is paid for also has guaranteed delivery.

Security

Security of the software update is covered in terms of confidentiality through encryption of the software update, and keys sent through blockchain to the owner. The key setup process exchanges keys for communication using an asymmetric cryptosystem defined as $\{KeyGen_a(\lambda), E_a(\chi,k), D_a(c,k)\}$.

KeyGen generates a key.
$E_a$ is the asymmetric encryption algorithm.
$D_a$ is an asymmetric decryption algorithm.
$\lambda$ is the security parameter
$\chi$ is the message (the software update $b_j$ or other data)
c is the encrypted message
k is a key Cryptosystems require input parameters which are a public key PK and a private (secret key) SK. The manufacturer and owner of the IoT devices create their key pairs to communicate securely between the manufacturer ($PK_{mi}$, $SK_{mi}$) and the owner ($PK_{oi}$, $SK_{oi}$). For this invention, this same methodology is used to establish a shared secret key between owner and manufacturer. The delivery of the keys through blockchain and the security of the framework algorithm is one of the innovations here.

For the purposes of this invention, the software update $b_j$ for the device is encrypted using symmetric encryption $E_s$ using a key $k_{bj}$. The key $k_{bj}$ itself is encrypted by $E_a(k_b, PK_{oi})$ by the manufacturer using the public key $PK_{oi}$ of the owner and sent to the blockchain. Thus, the integrity of both the key $k_b$ and the software update $b_j$ is guaranteed. The key $k_{bj}$ and contents of the software update $b_j$ cannot be opened and cannot be changed.

The integrity of the software update remains unaltered during communication. It is ensured through the use of cryptographic hashing. The cryptographic hash hEbj of the encrypted software update is sent to the blockchain as part of the update message (um). The cryptographic hash in one implementation could use the SHA3 algorithm, however is not limited to this specific algorithm.

The update message is described as um=UID||hEbj||Ea($k_{bj}$, $PK_{oi}$). The UID contains the version number of the software update. This prevents a rollback or roll forward attack. A rollback/forward attack is when an attacker pushes forward a valid software update to a less secure version of the software to enable a device to be attacked through known insecurities.

Posting software updates using the steps in the invention through blockchain and cloud allows sensitive information to not have to be installed on an IoT device when it is manufactured. Installing information on a device during manufacturing is a common, but insecure practice for many current point-of-sale IoT devices at cash registers.

To prevent impersonation attacks where a malicious actor impersonates a device's true manufacturer, embodiments of this invention leveraged a digital signature using ECDSA (elliptic curve digital signature algorithm) as it is both a secure and space-efficient algorithm for digital signatures.

Through these methods, the security of the software update for the IoT devices is maintained.

Auditability

The permanent and public record of the blockchain is leveraged for providing records that can be audited by the owner to know what versions of software are updated on which IoT devices. Moreover, the manufacturer can tell which devices are updated to better understand the security of the devices it has produced. This is particularly important in regulated environments (medical, automotive, power/electric) where individual safety is at risk.

Auditability is accomplished in step 14 (FIG. 2) by sending the software update installation parameters to the blockchain to enable the manufacturer and the owner to permit audits. The proof of installation is recorded as E(i||j||o||l, PKi)||E(i||j||o||l, PKol).

Smart Contract and Financial Transaction

Smart contracts are software-implemented algorithms that describe an indivisible atomic transaction on the blockchain. The smart contract algorithm ensures the delivery of fees for the software and also the installation of the software on the device. The smart contracts guarantee that both monies are paid and the software is delivered. The blockchain nodes are also incentivized for servicing the software update through smart contracts. In addition, the performance of our smart contracts is highly efficient as they use hashmaps providing O(1) (constant) computational time complexity.

Common IoT Attack Prevention

There are several common attacks against software updates and IoT devices that are prevented by the embodiments of the invention. Roll-back and roll-forward attacks are prevented by version information and by checking encrypted manifest information delivered to the owner. Replay message attacks by which malicious attackers replay valid messages are prevented through the framework's use of ECDSA signature algorithms. Malicious updates (altered updates) are prevented through confidentiality of encryption of data held in cloud and hashing algorithm to verify the integrity of the software. Sybil attack is defined by incentivization of blockchain nodes to grow a long highly secure blockchain. Denial-of-Service attack is prevented by protocol and IoT device maintaining valid and correct software updates.

The Protocol defines 14 steps achieving the objective describes infra. Specifically, these steps are:

Step 1: Manufacturer $m_i$ notifies owner $o_i$ of a new software update.

Step 2: Owner $o_i$ accepts/approves the software update to occur.

Step 3: Manufacturer $m_i$ uploads the symmetrically encrypted software update $E_s(b_j, k_b)$ to the cloud C. Symmetrical encryption is indicated by $E_s$.

Step 4: Manufacturer $m_i$ sends the smart contract to the blockchain payload node $p_k$.

Step 5: The blockchain payload node $p_k$ issues a request to the owner $o_l$ account for payment.

Step 6: The owner $o_l$ account satisfies payment and pays the fee for the blockchain payload node $p_k$.

Step 7: The blockchain payload node $p_k$ collects their fee and sends payment to the manufacturer $m_i$.

Step 8A: Manufacturer $m_i$ uploads the update message "um" which is composed of UID (uniquely identifies the manufacturer), and SHA3 hash $h_{Ebj}$ of the software update, and the asymmetrically encryption keys $E_a(k_{bj}, PK_{ol})$. $E_a$ indicates asymmetric encryption. $k_{bj}$ is the encryption keys. $PK_{ol}$ is the public key of the owner.

Step 8B: Manufacturer $m_i$ uploads the ECDSA signature σ indicated of the update message "um" to the blockchain.

Step 9: Queries a blockchain payload node $p_k$ for the software update.

Step 10A: The blockchain payload node $p_k$ sends the update message.

Step 10B: The blockchain payload node $p_k$ sends the ECDSA signature σ to the owner $o_l$.

Step 10C: The owner $o_l$ requests the encrypted software update file from the cloud C.

Step 11: The owner $o_l$ downloads the encrypted software update from the cloud C Step 12: The owner $o_l$ computes the SHA3 hash and compared it to $h_{Ebj}$. If the hashes match, the owner decrypts the encrypted software update and sends the software update $b_j$ and the UID to the device $d_{il}$.

Step 13: The device $d_{ij}$ notifies the owner $o_l$ of the software installation completion.

Step 14: The owner $o_l$ notified the payload node $p_k$ that the software installation occurred which is encrypted and recorded on the blockchain $E_a(i\|j\|o\|1, PK_i)\|E_a(i\|j\|o\|1, PK_{ol})$. This enables the manufacturer or owner to later perform an audit.

What is claimed is:

1. A method for updating software between a manufacturer and Internet of Things (IoT) devices of owners using a blockchain, comprising:
    (a) creating encryption keys for a software update and then further creating an encryption of the encryption keys;
    (b) storing on the blockchain: (p) the encryption of the encryption keys, (pp) an address of the encrypted software update; (ppp) a signature of a manufacturer, wherein the blockchain is defined as a distributed electronic database containing transaction records accessible over an Internet;
    (c) from an IoT device accessing the blockchain for (p), (pp) and (ppp); and
    (d) decrypting and installing the software update on the IoT device, wherein the installing updates the blockchain by creating an install transaction record on the blockchain, record the install transaction and encrypt the install transaction record making the install transaction record unchangeable.

2. The method as set forth in claim 1, further comprising encrypting the software update and storing the encrypted software update on a Cloud, wherein the Cloud is defined as a storage accessible over the Internet, and wherein the encrypting and storing is performed by the manufacturer.

3. The method as set forth in claim 1, further comprising the manufacturer notifying one or more owners regarding an availability of the software update for their respective IoT devices.

4. The method as set forth in claim 1, the one or more owners submitting a payment for the software update, wherein the payment transaction is via a software-coded secure transaction mechanism on the blockchain, wherein the transactions records stored on the blockchain are unchangeable upon creation of the transaction records, and wherein the unchangeability upon creation is enforced through cryptography.

5. The method as set forth in claim 4, further comprising the manufacturer auditing the software update of the IoT device by accessing the unchangeable install transaction record on the blockchain.

6. The method as set forth in claim 4, further comprising the one or more owners auditing the software update of the IoT device by accessing the unchangeable install transaction record on the blockchain.

* * * * *